United States Patent [19]

Chao

[11] Patent Number: 4,599,271
[45] Date of Patent: * Jul. 8, 1986

[54] MICROENCAPSULATION OF POLYISOCYANATES BY INTERCHANGE OF MULTIPLE

[75] Inventor: Hung-Ya Chao, Williamsville, N.Y.

[73] Assignee: Moore Business Forms, Inc., Grand Island, N.Y.

[*] Notice: The portion of the term of this patent subsequent to Jan. 22, 2002 has been disclaimed.

[21] Appl. No.: 648,964

[22] Filed: Sep. 10, 1984

Related U.S. Application Data

[63] Continuation-in-part of Ser. No. 502,477, Jun. 9, 1983, Pat. No. 4,495,509.

[51] Int. Cl.$^4$ .................. B01J 13/02; B32B 27/42
[52] U.S. Cl. .................. 428/402.21; 252/522 A; 264/4.7; 346/215; 424/19; 424/32; 427/213.34; 428/317.1; 428/402.2; 430/138; 521/912
[58] Field of Search .................. 264/4.7; 427/213.34; 428/402.2, 402.21

[56] References Cited

U.S. PATENT DOCUMENTS

| | | | |
|---|---|---|---|
| Re. 24,899 | 11/1960 | Green | 264/4.3 X |
| 2,299,694 | 10/1942 | Green | 106/22 X |
| 2,712,507 | 7/1955 | Green | 346/214 X |
| 3,016,308 | 1/1962 | Macaulay | 264/4.6 X |
| 3,405,070 | 10/1968 | Reyes | 264/4.1 |
| 3,429,827 | 2/1969 | Ruus | 264/4.7 X |
| 3,702,302 | 11/1972 | Wilson | 252/309 X |
| 3,720,534 | 3/1973 | Macaulay et al. | 521/63 X |
| 3,796,669 | 3/1974 | Kiritani et al. | 264/4.7 X |
| 3,886,084 | 5/1975 | Vassiliades | 428/402.24 |
| 3,886,085 | 5/1975 | Kiritani et al. | 264/4.7 X |
| 4,098,736 | 7/1978 | Li et al. | 252/309 X |
| 4,138,362 | 2/1979 | Vassiliades et al. | 428/402.21 |
| 4,193,889 | 3/1980 | Baatz et al. | 264/4.7 X |
| 4,273,672 | 6/1981 | Vassiliades | 264/4.1 |
| 4,285,720 | 8/1981 | Scher | 264/4.7 X |
| 4,299,723 | 11/1981 | Dahm et al. | 264/4.7 X |
| 4,413,843 | 11/1983 | Iwasaki et al. | 264/4.7 X |
| 4,417,916 | 11/1983 | Beestman et al. | 264/4.7 X |
| 4,495,509 | 1/1985 | Chao | 428/402.2 X |

OTHER PUBLICATIONS

"Electrostatic and Encapsulation Processes" *Encapsulation Processes and Apparatus,* pp. 202–208.

*Primary Examiner*—Richard D. Lovering
*Attorney, Agent, or Firm*—Allegretti, Newitt, Witcoff & McAndrews, Ltd.

[57] ABSTRACT

A method of microencapsulation is disclosed whereby two or more organic-in-aqueous emulsions, each containing a reactive component in the organic phase, are mixed together causing the reactive components to react and form polymeric walls around the organic droplets. Either, neither or both emulsions may contain one or more fill materials in their organic phases.

14 Claims, No Drawings

MICROENCAPSULATION OF POLYISOCYANATES BY INTERCHANGE OF MULTIPLE

BACKGROUND OF THE INVENTION

1. Field of the Invention

This application is a continuation-in-part of copending U.S. patent application Ser. No. 502,477, filed on June 9, 1983, now U.S. Pat. No. 4,495,509, issued on Jan. 22, 1985.

The present invention relates to microcapsules and methods of microencapsulating a core of fill material. The resulting microcapsules are adaptable to a variety of applications, but particularly for use in carbonless copying systems.

2. Background of the Invention

Microcapsules generally comprise a core of fill material surrounded by a wall or shell of polymeric material. The fill material may be either gaseous, liquid, or solid, and may be composed of a single substance, a solution, a suspension or a mixture of substances. The wall surrounding the core of fill material acts to isolate the fill material from the external environment. When it is desirable to release the fill material, the capsule wall may be ruptured by mechanical pressure, for example, thereby introducing the fill material into its surroundings. Generally, microcapsules comprise separate and discrete capsules having non-interconnecting hollow spaces for a fill material. The fill material is thus enveloped within the generally continuous polymeric walls of the microcapsules, which may range from 0.1 to approximately 500 microns in diameter.

Uses for microcapsules are as varied as the material that can be microencapsulated. Of particular importance are the uses of microcapsules in medicinal and biological preparations, fertilizers, flavorings, deodorizers, adhesives, surface coatings, foams, xerographic toners, and carbonless copying systems.

Though microcapsules and microencapsulation techniques are applicable to a wide variety of products, one of the most significant applications is their use in carbonless copying systems. The present invention is particularly adaptable to carbonless copying systems and will be discussed primarily in connection with such systems. However, it should be understood that the invention is not limited to carbonless copy applications and may be used wherever the use of microcapsules is beneficial.

Carbonless copying systems usually include a plurality of paper sheets arranged in a manifold set, each sheet of the set having one or more coatings on its surfaces. The manifold set is designed so that when a marking pressure caused by a typewriter, pen, or other instrument is applied to the outermost sheet, a colored mark will be formed on at least one surface of each sheet of the manifold set.

To this end, the top sheet of the manifold set to which the marking pressure is applied is provided with a coating on its back surface. This coated back surface includes microcapsules containing an initially colorless chemically reactive color-forming dye precursor as the fill material. The upper surface of the next sheet, which is adjacent to the back surface of the top sheet, is coated with a material containing a component, such as phenolic resin or reactive clay, that is capable of reacting with the colorless dye precursor contained in the microcapsules to produce a color. Thus, a marking pressure on the upper surface of the top sheet will rupture the microcapsules on the bottom surface and release the colorless dye precursor. The colorless dye precursor then chemically reacts with the reactive component of the coated front of the lower sheet to produce a colored mark corresponding to the area of marking pressure. In similar fashion, colored marks are produced on each succeeding sheet of the manifold set by the marking pressure rupturing the microcapsules carried on the lower surfaces of each sheet.

The sheets of the manifold set in carbonless copying systems are designated in the art by the terms CB, CFB, and CF, which stand respectively for "coated back," "coated front and back," and "coated front." The CB sheet is usually the top sheet of the manifold set and the sheet upon which the marking pressure is applied. The CFB sheets are the intermediate sheets of the manifold set, each of which is able to have a mark formed on its front surface by a marking pressure and each of which also transmits the contents of ruptured microcapsules from its back surface to the front surface of the next sheet. The CF sheet is the bottom sheet and is only coated on its front surface so that an image may be formed thereon.

While it is customary to have the coating containing the microcapsules on the back surface of the sheets and to have the coating containing the reactive component for the capsules on the front surface of each of the sheets, a reverse arrangement is also possible. In addition, one or more of the reactive ingredients may be carried in the sheets themselves, rather than applied as surface coatings. Furthermore, the reactive component for the colorless dye precursor may be microencapsulated. Patents illustrative of the various kinds of systems that may be used in the production of manifold carbonless copying systems include by way of example, U.S. Pat. Nos. 2,299,694 (Green); 2,712,507 (Green); 3,016,308 (Macauley); 3,429,827 (Ruus); and 3,720,534 (Macauley et al).

Another significant use of microcapsules and microencapsulation techniques is the enclosure of highly reactive polyisocyanates. These compounds have a wide variety of applications, including use as a coreactant in forming surface coatings, adhesives, and foams, as is well known in the polymeric arts. Due to the extreme reactivity of most of polyisocyanates, however, it is desirable to isolate them from the external environment until such time as they are reacted with a coreactant to form the desired polymeric product.

The literature contains many methods and techniques for preparing microcapsules, whereby two or more reactive components are brought together to form a microcapsular wall. A majority of these methods form the encapsulating walls by providing minute discrete droplets containing the intended fill material dispersed within a continuous phase that contains at least one of the reactive components. In one class of microencapsulation technique, the walls of the microcapsules are formed from reactive components that are present only in the continuous phase and not within the dispersed droplets. Examples of such microencapsulation methods are the urea-formaldehyde polymerization technique disclosed in U.S. Pat. No. 3,016,308 (Macauley) and the coacervation methods described in U.S. Pat. No. Re. 24,899 (Green). The Macauley patent teaches the formation of a high molecular weight urea-formaldehyde condensate wall from a urea-formaldehyde precondensate that is present in the continuous, aqueous phase. The reaction is carried out by adjusting the pH of the continuous phase. The Green patent discloses forming a gelatinous coating around oil droplets containing the fill material. This coating is then hardened into microcapsule walls by cross-linking agents present in the aqueous continuous phase.

A second class of microencapsulation is interfacial polycondensation exemplified by U.S. Pat. No. 3,429,827 (Ruus). The method taught by Ruus includes producing an aqueous dispersion of a water immiscible organic liquid containing one of the reactive components. A second reactant is then added to the aqueous phase whereupon the reactants form a polymer wall at the interface between the aqueous and organic phases. For example, the organic dispersed phase may contain compounds such as diacid chloride or mixtures of diacid chloride and disulfonyl chloride, and the aqueous continuous phase may contain compounds such as hexamethylenediamine, ethylenediamine, diethylenetriamine, triethylenetetramine, tetraethylenepentamine, or mixtures of a polyamine and polyol, such as bisphenol A, thus forming microcapsules having polyamide or copolyamide walls.

One possible disadvantage with the interfacial polycondensation method taught by Ruus is that at least one of the reactive compounds must be soluble in the aqueous phase. Thus, for example, the formation of a microcapsule through the reaction of an acid chloride with an aromatic amine, rather than an aliphatic amine, has not been possible via interfacial condensation since aromatic amine compounds are generally insoluble in aqueous solutions. The use of an acid chloride/aromatic amine pair is not feasible with coacervation techniques because they are not oppositely charged polyelectrolytes. Thus, there is a need in the art for a microencapsulation technique that would allow the use of two or more highly reactive components that are both substantially insoluble in aqueous media.

Various microencapsulation techniques using polyisocyanate compounds have been reported in the literature. For example, U.S. Pat. Nos. 4,299,723 (Dahm et al.); 4,285,720 (Scher); 4,193,889 (Baatz et al.); 4,138,362 (Vassiliades et al.); 3,886,085 (Kiritani et al.); and 3,796,669 (Kiritani et al.) all disclose methods of forming microcapsular walls from the reaction of polyisocyanates with amine compounds. However, all of these patents teach microcapsules formed by interfacial polycondensation techniques. While some limited success may be achieved in microencapsulating polyisocyanates with these and other known methods of microencapsulation, the high reactivity of the polyisocyanate compounds renders them difficult to adequately encapsulate using these older methods. Therefore, there is a need in the art for a microencapsulation technique that would allow the easy and effective microencapsulation of polyisocyanates.

SUMMARY OF THE INVENTION

It is an object of the present invention to provide methods of producing microcapsules through the interchange of a plurality of emulsions. It is believed that the present invention is directed to an entirely novel class of microencapsulation techniques. Specifically, two organic-in-aqueous emulsions are prepared, each containing at least one oil soluble reactive compound that will react to form polymeric microcapsular walls when brought in contact with each other. The first organic-in-aqueous emulsion comprises a first organic solution having a first oil soluble reactive material dissolved therein. This first organic solution is then emulsified within a first aqueous emulsification solution to form the first organic-in-aqueous emulsion. The second organic-in-aqueous emulsion includes a second oil soluble reactive material dissolved in a second organic solution. The second organic solution is likewise emulsified within a second aqueous emulsification solution such that the second organic-in-aqueous emulsion is formed.

Microencapsulation in accordance with the present invention is obtained by mixing the two organic-in-aqueous emulsions for a time and temperature sufficient to permit the emulsified organic droplets of each emulsion to collide with one another. Collision of two or more emulsion droplets causes the emulsified droplets to exchange at least a portion of their contents. This is believed to occur either through the merger or coalescence of multiple droplets into a single droplet following a collision, or through the exchange of the contents of the droplets during an elastic collision. Regardless of the precise mechanism, however, the contents of colliding droplets are transferred to some extent such that the reactive materials are brought into reactive contact with each other. Thus, collisions between the droplets of the two emulsions initiate chemical reactions between the reactive materials such that a generally continuous polymeric microcapsular wall is formed around an emulsion droplet. In the case of an elastic collision, two or more separate microcapsules may be formed, while in the case of a merging collision, only one microcapsule results.

In the context of the present invention, the fill material may be dissolved in either the first or the second organic-in-aqueous emulsion or both emulsions. Alternatively, the fill material may be present in a third emulsion that may or may not contain a reactive material dissolved in the third organic solution. A plurality of fill materials may also be used separated between the various emulsions. As an example, when two fill materials are placed in separate organic-in-aqueous emulsions that are mixed together, microcapsules containing proportions of both fill materials result.

The organic solvents used to dissolve the reactive and fill materials with the present invention may be the same for the various emulsions of the present invention or they may be different. Likewise, the aqueous emulsification solutions may be identical for the various organic-in-aqueous emulsions or they may be different. The reactive materials used should be oil soluble and should react to form a polymeric substance suitable for forming a generally continuous microcapsular wall. Many suitable reactive components are well known in the prior art. Though the present invention is useful with any combination of oil soluble reactive compounds, the present invention is particularly useful where neither of the reactive compounds are sufficiently soluble in aqueous solution to be used with the prior art interfacial condensation or coacervation techniques described above. The present invention may use two or more emulsions, though the use of more than four emulsions would be unnecessary in most instances.

Further objects and embodiments of the present invention will become evident in the following description of the preferred embodiments and claims.

DESCRIPTION OF THE PREFERRED EMBODIMENTS

Many compounds can be used as the reactive material to form polymeric capsule walls according to the present invention. In theory, any combination of oil soluble reactive materials that yields a generally continuous polymeric wall suitable for microencapsulation may be used. Table I below lists some examples of combinations of oil soluble reactive compounds contemplated by the present invention and the type of polymeric wall formed by their reaction.

TABLE I

| Reactive Material 1 | Reactive Material 2 | Resulting Polymer Wall |
| --- | --- | --- |
| Acid Chloride | Amine | Polyamide |
| Acid Chloride | Bisphenol | Polyester |
| Sulfonyl Chloride | Amine | Polysulfonamide |
| Sulfonyl Chloride | Bisphenol | Polysulfonate |
| Isocyanate | Amine | Polyurea |
| Isocyanate | Bisphenol | Polyurethane |
| Bischloroformate | Amine | Polyurethane |
| Epoxy | Amine | Cured Epoxy |

Among the acid chlorides that are particularly useful in connection with the present invention are the following: azelayl dichloride, 1,4-cyclohexanedicarbonyl chloride, sebacyl dichloride, phthaloyl chloride, isophthaloyl chloride, terephthaloyl chloride (TCL), tetrachloroterephthaloyl chloride, 4,4'-biphenyldicarbonyl chloride, naphthalene dicarbonyl chloride, and 1,3,5-benzenetricarboxylic acid chloride.

Examples of sulfonyl chlorides that are particularly useful in connection with the present invention are 4,4-sulfonyldibenzoyl chloride, 1,3 benzenedisulfonyl chloride, 1,4-benzenedisulfonyl chloride, 1,5 naphthalene disulfonyl chloride, 2,7-naphthalene disulfonyl chloride, 4,4'-bisphenyldisulfonyl chloride, methylene bis(4-benzenesulfonyl chloride), and sulfonyl bis(4-benzenesulfonyl chloride).

Examples of isocyanate compounds that are particularly useful with the present invention are the following: toluene diisocyanate (TDI), 1,4-cyclohexylenediisocyanate, 4,4'-bisphenylene diisocyanate, 4-methyl-1,2-phenylenediisocyanate, 3,3'-dimethyl-4,4'-biphenylenediisocyanate, 3,3'-dimethoxy-4,4'-biphenylenediisocyanate, 1,4 phenylenediisocyanate, hexamethylenediisocyanate, octamethylenediisocyanate, p,p'-diphenylmethane diisocyanate, 4-methyl-1,3-phenylene diisocyanate, 2,4,6-trimethyl-1,3-phenylene diisocyanate, bis(3-isocyanatocyclohexyl)methane, 2,4,5,6-tetra-methyl-1,4-phenylene diisocyanate, 1,2-bis(4-isocyanatophenyl)ethane, 2,2-bis(4-isocyanatophenyl)ether, bis(4-isocyanatophenyl)sulfone, 4,4'diphenyl methanediisocyanate, triphenylmethane-pp'p"-triyltriisocyanate, polyisocyanate prepolymers, toluene-diisocyanate alcohol adducts, aromatic/aliphatic polyisocyanate copolymers, modified diphenyl methane diisocyanates, polyisocyanurates of toluene diisocyanate, and polymethylene polyphenylisocyanates.

Examples of bischloroformate compounds that may be used in connection with the present microencapsulation techniques are the following: ethylenebischloroformate, tetramethylene bischloroformate, 1,4-cyclohexylene bischloroformate, hexamethylene bischloroformate, and 2,2-dimethyltrimethylene bischloroformate. Examples of epoxy compounds useful as oil soluble reactive materials in connection with the present invention are the following: methylenedianiline based epoxy resin, bisphenol based epoxy resin, methylolated bisphenol A based epoxy resin, p-aminophenol based epoxy resin, 1,1,2,2-(p-hydroxyphenol)ethane based epoxy resin, phenol novolac epoxy resin, and cresol novolac epoxy resin.

Among the amine compounds that are useful in connection with the present invention are the following: bis(4-aminophenyl)methane, phenylenediamines including O,p,m-phenylenediamine and 4,5-dimethyl-o-phenylenediamine, naphthalene diamines including 1,5-diaminonaphthalene, 2,2-bis(4-aminophenyl)propane, 2,4-bis(p-aminobenzyl)aniline (BABA), bis(p-aminocyclohexyl)methane, bishexamethylenetriamine (BHMT), bis(4-aminophenyl)ketone, bis(4-aminophenyl)ether, 2,4-toluene diamine 2,6-toluene-diamine, 3,4-toluenediamine, polymethylene polyphenylamine, 4,4-methylenedianiline, 4,5-diaminoacenaphthene, 3,3-diaminobenzidine, 3,6-diamino durene, 2,7-diaminofluorene, 9,10-diaminophenanthrene and bis(4-aminophenyl)sulfone. Examples of bisphenol compounds useful in connection with the present invention are as follows: 2,2-bis(4-hydroxyphenyl)propane, 2,2-bis(4-hydroxyphenyl)butane, 1,6-dihydroxynaphthalene, 2,7-dihydroxynaphthalene, 4,4'-dihydroxybiphenyl, bis(4-hydroxy-3-methyl phenyl)methane, 1,1 bis(4-hydroxyphenyl)ethane, 3,3-bis(4-hydroxyphenyl)pentane, and bis(4-hydroxyphenyl)sulfone.

In connection with carbonless copy systems, the fill material to be encapsulated within the inventive microcapsules will usually be a colorless dye precursor such as crystal violet lactone (CVL), benzoylleucomethylene blue (BLMB), rhodamine lactam, p-toluenesulfinate of Michler's hydrol (PTSMH), or any of the various chromogenic compounds that are capable of changing from a colorless to a colored form on contact with reactive substances, such as phenolic resins or reactive clays.

When a colorless dye precursor is used as the fill material, an organic solvent capable of dissolving or suspending the dye precursor must be used. Suitable organic solvents include benzylbutylphthalate (BBP), dibutylphthalate (DBP), toluene, various xylenes, alkylbenzenes, alkylnaphthalenes, and biphenyls. Aqueous emulsification solutions that are useful with respect to the present invention include emulsifiers such as polyvinylpyrrolidone, polyvinyl alcohol, polyethylene glycol, starch, carboxymethylcellulose, and hydroxyethylcellulose, dissolved in water.

Of course, the novel methods of microencapsulation and microcapsules disclosed here are not limited to use on carbonless copying systems. The fill material could comprise pesticides, insecticides, flavors, fragrances, colored dye solutions, oils, solvents, xerographic toners, plasticizers, or any other materials where microencapsulation would be beneficial. For example, capsules prepared by this invention would be useful for slow release applications.

In general, the fill material to be microencapsulated and a first reactive material are both dissolved within a mutual organic solvent to form the first organic solution. Additional fill material, which may be identical to the first fill material or different, is similarly mixed and dissolved with a second reactive material in a mutual organic solvent, which may or may not be identical to the organic solvent used with the first fill material. The resulting organic solutions are then separately emulsified into organic-in-aqueous emulsions in the presence of aqueous emulsification solutions. Preferably, the organic droplets formed have sizes in the range of 1 to 20 microns. Different emulsification solutions may be used for the various emulsions or the same solution may be used. The two emulsions are then mixed together and stirred for approximately four to twenty-four hours at room temperature. Alternatively, the two emulsions are mixed together and heated to 30°-80° C. to complete the reaction between the two reactive materials. During the time that the two emulsions are mixed, droplets from each emulsion collide with droplets of the other emulsion and transfer or merge their contents to some extent. This initiates the reaction between the two reactive materials such that generally continuous polymeric walls are formed surrounding emulsion droplets. The resulting microcapsules are generally within the range of 1 to 20 microns and have 5 to 30% of the total microcapsule weight constituting wall material.

The proper ratio of the two reactants may be determined by using approximately equal equivalent weights. However, ratios of equivalent weights that are greater or less than one may produce better quality or yield of microcapsules. The most effective ratio may be determined by routine experiments. Where it is desirable to encapsulate a polyisocyanate, the polyisocyanate should desirably be present in stoichiometric excess as compared with the second reactive amine material such that upon completion of the microencapsulation reaction the excess polyisocyanate remains within the interior of the formed microcapsule.

In another embodiment of the present invention, the fill material is not present in the emulsions that contain the reactive materials. For example, the fill material can be placed in its own organic-in-aqueous emulsion. In addition, more than two reactive materials may be present in two or more organic-in-aqueous emulsions. Furthermore, a plurality of fill materials may be used and, if desirable, may be separated into various emulsions. This separation of distinct fill materials results in composite microcapsules containing some combination of the plurality of fill materials.

EXAMPLE 1

A. Preparation of Organic Solution 1

8.65 parts of 1.1.2.2-(p-hydroxyphenol)ethane based epoxy resin, commercially available as Ciba-Geigy epoxy resin 0163 from Ciba-Geigy Corporation, and 2.4 parts of PTSMH were heat dissolved in 30 parts of BBP. The solution was afterwards brought to room temperature.

B. Preparation of Organic Solution 2

2.36 parts of BABA was heat dissolved in 30 parts of BBP and the resulting solution was cooled to room temperature.

C. Preparation of Organic-In-Aqueous Emulsions

Organic Solutions 1 and 2 were each emulsified in a Waring blender using 65 parts of a 3% Vinol 540 aqueous solution as an emulsifier (Vinol 540 is a partial hydrolyzed polyvinyl alcohol, commercially available from Air Products & Chemicals, Inc.) until organic droplet sizes on the order of about 1-20 microns were obtained.

D. Preparation of Microcapsules

The above two emulsions were poured into a glass jar container and stirred at low speed at 45° C. for 4 hours, after which time the mix was stirred at room temperature for another 16 hours to complete the microencapsulation reaction. A slurry containing the above microcapsules was coated on a paper substrate at a coating weight of about 3.3 grams per square meter. This CB coating produced a very distinctive blue image upon impact on an active clay coated CF sheet. Under a scanning electron microscope (SEM), spherical individual capsules were noted on the CB sheet.

EXAMPLES 2-8

In these examples, the procedures described above in Example 1 were repeated except that differing compositions were used in preparing the two emulsions, as noted below.

| | Organic-In-Aqueous Emulsion 1 | Organic-In-Aqueous Emulsion 2 | Microencapsulation Conditions |
|---|---|---|---|
| 2. | 8.53 parts Ciba-Geigy epoxy 0510 (a triglycidyl ether amine of p-aminophenol sold by Ciba-Geigy) 2.4 parts PTSMH 30 parts BBP in 75 parts of 3% Vinol 540 aqueous solution | 2.48 parts BHMT 30 parts BBP in 55 parts of 3% Vinol 540 aqueous solution | After mixing the two emulsions, the mixture was stirred at 45° C. for 4 hours, and then at room temperature for 16 hours. |
| 3. | 9.1 parts Apogen 101 (a methylolated epichlorohydrin/bisphenol A type resin sold by Schaefer Chemical company) 2.4 parts PTSMH 30 parts BBP in 75 parts of 3% Vinol 540 aqueous solution | 2.10 parts BHMT 30 parts BBP in 55 parts of 3% Vinol 540 aqueous solution | Same as Example 2 |
| 4. | 5.22 parts TDI 30 parts DBP in 55 parts of 3% Vinol 540 aqueous solution | 5.94 parts methylenedianiline 2.4 parts PTSMH 30 parts DBP in 75 parts of 3% Vinol 540 aqueous solution | After mixing the two emulsions, the mixture was stirred at room temperature for 6 hrs. |
| 5. | 4.66 parts TDI 3.36 parts CVL 0.84 parts BLMB 30 parts of diisopropylnaphthalene in 75 parts of 3% Vinol 540 aqueous solution | 3.84 parts BHMT 30 parts DBP in 55 parts of 3% Vinol 540 aqueous solution | Same as Example 4. |
| 6. | 4.34 parts m-benzenedisulfonyl chloride 2.4 parts PTSMH 30 parts DBP in 75 parts of 3% Vinol 540 aqueous solution | 3.19 parts BABA 30 parts BBP in 55 parts of 3% Vinol 540 aqueous solution | After mixing the two emulsions, 8.4 parts of a 20% Na$_2$CO$_3$ solution was added to the mixtrue to neutralize the byproduct, HCl. The mixture was stirred at room temperature for 16 hours. |
| 7. | 4.08 parts TCL 30 parts BBP in 55 parts of 3% Vinol 540 aqueous solution | 4.06 parts of BABA 2.4 parts PTSMH 30 parts DBP in 75 parts of 3% Vinol 540 aqueous solution | After mixing the emulsions, 10.65 parts of a 20% was addeed. The mixture was stirred at room temperature for 18 hours. |
| 8. | 6.08 parts TCL 30 parts BBP 2.4 parts of PTSMH | 5.94 parts methylenedianiline 30 parts DBP | After mixing the two emulsions, 15.9 parts of a 20% |

| Organic-In-Aqueous Emulsion 1 | Organic-In-Aqueous Emulsion 2 | Microencapsulation Conditions |
|---|---|---|
| 75 parts of 3% in Vinol 540 aqueous solution | in 55 parts of 3% Vinol 540 aqueous solution | Na$_2$CO$_3$ solution was added. The mixture was stirred at room temperature for 24 hours. |

The microcapsules prepared in accordance with Examples 2-8 were coated onto a paper substrate at a coating weight of approximately 3.0-3.5 g/m². The coated paper, upon impact on a clay coated receiving sheet, produced a very good blue image. SEM micrographs of the CB sheets of Examples 3, 6, and 7 were taken and showed good microcapsular formation.

EXAMPLE 9

A first organic solution consisting of 17.5 parts of pine oil, a fragrance material, and 2.24 parts of BHMT was prepared. A second organic solution consisting of 17.5 parts of pine oil mixed with 2.72 parts of TDI was also prepared. These two solutions were each emulsified in 50 parts of a 2% Vinol 540 aqueous solution until the sizes of the microdroplets were in the 1-20 microns range. The two emulsions were then mixed together and stirred at room temperature for about 8 hours to complete the microencapsulation reaction. The capsules, upon breaking under the pressure of a fingernail, released a strong odor of pine oil. Under SEM, good microcapsular formation was observed.

EXAMPLE 10

In this example, microcapsules were prepared by mixing three emulsions together. The first emulsion included 2.4 parts of PTSMH dissolved in 20 parts of DBP and emulsified in 66.7 parts of a 2% Vinol 540 aqueous solution. The second organic-in-aqueous emulsion included 4.06 parts of BABA dissolved in 20 parts of DBP and emulsified in 66.7 parts of 2% Vinol 540 aqueous solution. The third emulsion included 4.08 parts of TCL dissolved in 20 parts of DBP and emulsified in 66.7 parts of 2% Vinol 540 aqueous solution. The above three emulsions were each prepared in a 1-20 microns range. The emulsions were then mixed together and 2.13 parts of sodium carbonate dissolved in 20 parts of water was added into the slurry to neutralize the reaction by-product, HCl. The slurry was then stirred at room temperature for approximately 20 hours to complete the microencapsulation reaction. Under SEM observation, good microcapsules were noted.

EXAMPLE 11

In this example, three emulsions were mixed to form microcapsules.
Organic Solution 1: 9.1 parts of Apogen 101 was dissolved in 20 parts of DBP.
Organic Solution 2: 2.1 parts of BHMT was mixed with 20 parts of BBP.
Organic Solution 3: 2.4 parts of PTSMH was dissolved in 20 parts of diisopropyl naphthalene.
These three organic solutions were each emulsified in 66.7 parts of a 2% Vinol 540 aqueous solution until the sizes of the emulsions were in the 1-20 microns range. The emulsions were then mixed together and stirred at approximately 60° C. for 2 hours and at room temperature for 16 hours to complete the microencapsulation reaction. The resulting microcapsules were coated on a paper substrate at about 3.3 g/m² coating weight. This coated sheet was found to produce a very good blue image upon writing against a clay coated receiving sheet. Under SEM, good spherical microcapsules were noted.

In the following Examples 12-17, microcapsules containing highly reactive polyisocyanate compounds were formed. Though these microcapsules are not designed for use in carbonless systems, they are very useful as coreactants in forming various foams, adhesives, and surface coatings.

EXAMPLE 12

Sixty-five parts of Isonate 125M (a, 4,4'-diphenylmethane diisocyanate commercially available from Upjohn Polymer Chemicals) was dissolved in 35 parts of DBP. The solution was then emulsified in 125 parts of a 3% Vinol 523 solution (Vinol 523 is a partially hydrolyzed polyvinyl alcohol sold by Air Products and Chemicals, Inc.) using a Waring blender until microdroplets of about 1-20 microns were obtained. 3.15 parts of BABA was dissolved in 10 parts of DBP and emulsified in 32.5 parts of 3% Vinol 523 solution until particle sizes of about 1-20 microns were obtained. The two emulsions were then mixed in a glass container and stirred with a low speed mechanical stirrer at room temperature for about 24 hours. Under SEM, spherical microcapsules were observed.

EXAMPLE 13

72.04 parts of Mondur MRS (a polymethylene polyphenylisocyanate commercially available from Mobay Chemical Corporation) was mixed with 25 parts of DBP and then emulsified in 130 parts of a 3% Vinol 523 solution until particle sizes of between 1-20 microns were obtained. 5.62 parts of BABA in 10 parts of DBP solution was also emulsified similarly in 32.5 parts of 3% Vinol 523 solution. The two emulsions were mixed and stirred for about 20 hours. Under SEM, spherical microcapsules were obtained.

EXAMPLE 14

56.76 parts of Mondur XP-744 (a modified p,p'-diphenylmethane diisocyanate from Mobay Chemical Corporation) was emulsified in 97.5 parts of a 3% Vinol 523 solution until microdroplet particles of about 1-20 microns were obtained. 3.81 parts of BABA in 10 parts of DBP solution were similarly emulsified in 32.5 parts of 3% Vinol 523 solution. The two emulsions were then stirred together at room temperature for about 16 hours, after which microcapsule formation was observed under SEM.

EXAMPLE 15

56.2 parts of Isonate 143L (a modified diphenylmethane diisocyanate from Upjohn Polymer Chemicals) was emulsified in 97.5 parts of a Vinol 523 solution with microdroplet sizes of about 1-20 microns were obtained. 4.37 parts of BABA in 10 parts of DBP solution was also similarly emulsified in 32.5 parts of 3% Vinol 523 solution. The two emulsions were then mixed and stirred at room temperature for about 16 hours. Microcapsules were obtained as observed under SEM.

EXAMPLE 16

58.07 parts of Mondur CB-75 (a toluene diisocyanate-alcohol adduct obtained from Mobay Chemical Corporation) was emulsified in 97.5 parts of 3% Vinol 523 solution until particle sizes of 1–30 microns were obtained. 2.5 parts of BABA dissolved in 10 parts of DBP solution was also emulsified in 32.5 parts of 3% Vinol 523 solution. The two emulsions were then mixed and stirred together at room temperature for about 16 hours, at which time microcapsules were observed under SEM.

EXAMPLE 17

58.28 parts of Mondur HC (an aromatic/aliphatic polyisocyanate copolymer from Mobay Chemical Corporation) was emulsified in 97.5 parts of 3% Vinol 523 solution until particle sizes of about 1–30 microns were obtained. 2.29 parts of BABA in 10 parts of DBP solution was also emulsified in 32.5 parts of 3% Vinol 523 solution. The two emulsions were then mixed and stirred together at room temperature for about 16 hours. Microcapsules were obtained as evidenced by SEM observation.

It is to be understood that the above specification emphasizes certain embodiments and features of the present invention and that many embodiments not specifically described above may come within the spirit and scope of the present invention as claimed hereafter.

I hereby claim as my invention:

1. A method of making microcapsules having generally continuous polymeric walls comprising the following steps:
   (a) preparing a first organic-in-aqueous emulsion comprising a first organic solution having a first oil soluble reactive material dissolved therein and a first aqueous emulsification solution, said first oil soluble reactive material being a polyisocyanate;
   (b) preparing a second organic-in-aqueous emulsion comprising a second organic solution having a second oil soluble reactive material dissolved therein and a second aqueous emulsification solution, said second oil soluble reactive material being an amine; and
   (c) mixing said organic-in-aqueous emulsions such that said oil soluble reactive materials react to form said microcapsules, said microcapsules encapsulating said first oil soluble reactive material.

2. The method of claim 1 wherein the microcapsules range in size from 1 to 20 microns.

3. The method of claim 1 wherein each of said aqueous emulsification solutions comprises at least one emulsifier selected from the group consisting of polyvinylpyrrolidone, polyvinyl alcohol, polyethylene glycol, starch, carboxymethylcellulose, and hydroxyethylcellulose.

4. The method of claim 1 wherein said organic-in-aqueous emulsions include a plurality of organic droplets having sizes in the range of 1 to 20 microns.

5. The method of claim 1 wherein said mixing of said organic-in-aqueous emulsions comprises stirring said emulsions for approximately 4 to 24 hours.

6. The method of claim 5 wherein said organic-in-aqueous emulsions are stirred at a temperature in the range of 20° C. to 80° C.

7. The method of claim 1 wherein said polyisocyanate is present in stoichiometric excess with respect to said amine.

8. Microcapsules having generally continuous polymeric walls prepared by a method comprising the following steps:
   (a) preparing a first organic-in-aqueous emulsion comprising a first organic solution having a first oil soluble reactive material dissolved therein and a first aqueous emulsification solution, said first oil soluble reactive material being a polyisocyanate;
   (b) preparing a second organic-in-aqueous emulsion comprising a second organic solution having a second oil soluble reactive material dissolved therein and a second aqueous emulsification solution, said second oil soluble reactive material being an amine; and
   (c) mixing said organic-in-aqueous emulsions such that said oil soluble reactive materials react to form said microcapsules, said microcapsules encapsulating said first oil soluble reactive material.

9. The microcapsules of claim 8 wherein said microcapsules range in size from 1 to 20 microns.

10. The microcapsules of claim 8 wherein each of said aqueous emulsification solutions comprises at least one emulsifier selected from the group consisting of polyvinylpyrrolidone, polyvinyl alcohol, polyethylene glycol, starch, carboxymethylcellulose, and hydroxyethylcellulose.

11. The microcapsules of claim 8 wherein said organic-in-aqueous emulsions include a plurality of organic droplets having sizes in the range of 1 to 20 microns.

12. The microcapsules of claim 8 wherein said mixing of said organic-in-aqueous emulsions comprises stirring said emulsions for approximately 4 to 24 hours.

13. The microcapsules of claim 12 wherein said organic-in-aqueous emulsions are stirred at a temperature in the range of 20° C. to 80° C.

14. The microcapsules of claim 8 wherein said polyisocyanate is present in stoichiometric excess with respect to said amine.

* * * * *